(12) United States Patent
Morgan (10) Patent No.: US 8,023,175 B2
(45) Date of Patent: Sep. 20, 2011

(54) DYNAMIC IMAGING AND/OR IDENTIFICATION APPARATUS AND METHOD THEREOF

(75) Inventor: Brian Carl Morgan, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 232 days.

(21) Appl. No.: 12/367,087

(22) Filed: Feb. 6, 2009

(65) Prior Publication Data

US 2010/0202040 A1   Aug. 12, 2010

(51) Int. Cl.
G02B 26/00   (2006.01)
(52) U.S. Cl. ......................................................... 359/295
(58) Field of Classification Search ........... 359/290–295
See application file for complete search history.

(56) References Cited

U.S. PATENT DOCUMENTS

| | | | |
|---|---|---|---|
| 4,710,732 A | | 12/1987 | Hornbeck |
| 5,468,540 A | * | 11/1995 | Lu ................................. 428/156 |
| 5,818,023 A | | 10/1998 | Meyerson et al. |
| 6,233,088 B1 | * | 5/2001 | Roberson et al. ............. 359/291 |
| 6,421,013 B1 | | 7/2002 | Chung |
| 6,504,941 B2 | | 1/2003 | Wong |
| 6,545,385 B2 | * | 4/2003 | Miller et al. ................... 310/309 |
| 6,775,048 B1 | | 8/2004 | Starkweather et al. |
| 6,807,012 B2 | * | 10/2004 | Marco ............................ 359/676 |
| 7,006,276 B2 | | 2/2006 | Starkweather |
| 7,116,462 B2 | * | 10/2006 | Ikeda ............................ 359/291 |
| 7,136,215 B1 | * | 11/2006 | Machida et al. .............. 359/295 |
| 7,283,112 B2 | | 10/2007 | Starkweather et al. |
| 2003/0164814 A1 | | 9/2003 | Starkweather et al. |
| 2005/0248827 A1 | | 11/2005 | Starkweather et al. |

OTHER PUBLICATIONS

"MEMS-ID the Word for New Wave RFID Technology" posted at www.mems-id.com/news/ICA-PR-060118.pdf. no date.

* cited by examiner

*Primary Examiner* — Scott J Sugarman
*Assistant Examiner* — Vipin M Patel
(74) *Attorney, Agent, or Firm* — Lawrence E. Anderson

(57) ABSTRACT

A preferred embodiment comprises a dynamic display based on a program image element which will only generate a preprogrammed image. As an example, the image element may comprise electrically-driven MEMS mirrors. This example may be embedded in an ID card. At the time of issue of the ID card, pixels in the mirror array will be permanently programmed as either 'alive' or 'dead' in a pattern matching the photo of the person in question. When stimulated, only 'alive' pixels will actuate, creating an image for comparison to the adjacent printed photo. Due to its dynamic behavior, delicate mechanical structures, and single-time hard-wiring, duplication of, or tampering with, this secondary dynamic image will be nearly impossible. The ID car is but one exemplary application and other embodiments, applications, and methods are described in the specification and claims.

20 Claims, 10 Drawing Sheets
(6 of 10 Drawing Sheet(s) Filed in Color)

"OFF" / reflective state

"ON" state

"OFF" / reflective state

"ON" state

FIGURE 1

"OFF" / reflective state

"ON" state/ application of potential

(1) If the program V1 is at ground, no current flows and the pixel remains 'active'. (2) If each program V1 & V2 are at a predetermined level, a large current conducts from T1 to T4 such that the thin film 'fuse' 9 is broken, breaking the connection between terminal T3 and T4, "de-activating" the pixel to effectuate programming.

Mechanical input $F_x$
For $F_0 \leq F_1 \leq F_2 \leq F_3 \leq F_4$:

$F_0$ = no actuation $F_1$ = only longest cantilever actuates $F_2$ = first 2 cantilevers actuate $F_3$ = first 3 cantilevers actuate $F_4$ = all cantilevers actuate

FIGURE 5

"Fly swatter" form may be replaced by a mirror or reflector element.

FIGURE 6

FIGURE 8 torsional piezoelectric actuator made of cascaded cantilevers.

DYNAMIC IMAGING AND/OR IDENTIFICATION APPARATUS AND METHOD THEREOF

STATEMENT OF GOVERNMENT INTEREST

The invention described herein may be manufactured, used, and licensed by or for the United States Government.

FIELD OF THE INVENTION

This invention relates broadly to image retention and more particularly to identification of objects or persons using displays and/or images.

BACKGROUND OF THE INVENTION

Photographic identification (ID) cards are widely used by government and private institutions to ensure that the bearer (or subject) of said card matches the identity of whom the rights/privileges were originally bestowed by the issuer. Traditionally ID cards contain static photographs, possibly covered with lamination or a hologram. The widespread availability and low-cost of such equipment inherently makes these features easy to replicate. RFID tags or computer chips are attractive for embedding further information, but have limited capacity and may be require power hungry readers with maintained databases in order to access/verify the information. Thus, the last line of defense often remains a simple photo ID which due to recent advances in image quality printing/lamination, is remarkably easy to duplicate/replace. Research by the Washington Times™ (16 May 2008) concluded that even the brand new electronic-passport card can "be copied or altered easily by removing the photograph with solvent and replacing it with one from an unauthorized user." One example of the immediate danger posed by fake/forged IDs took place in Baquabah, Iraq on Aug. 23, 2005. A suicide bomber from Al Qaeda in Iraq used a fake ID to enter a dining facility; the ensuing explosion not only destroyed the building, but also killed 2 US personnel while injuring 6 more.

In view of several incidents of false identification resulting in tragic consequences as well as the rise of identity thief in general, there is a growing need for the development of a portable dynamic photo identification system ID card which contains a tamper-resistant/replication-resistant image or photo. Such cards would have particular appeal in high security and/or military environments. For example, tamper-resistant IDs could prevent unauthorized personnel from using forged IDs to pass checkpoints or to gain access to airports, bases, secured properties, nuclear facilities, etc.

Microelectromechanical systems (MEMS) (also written as micro-electro-mechanical, or MicroElectroMechanical) is the terminology used to describe very small system devices, which according to Wikipedia, generally ranging in size from 20 micrometers (20 millionths of a meter) to a millimeter. In Japan, MEMS devices are also referred to as micromachines, or Micro Systems Technology—MST (in Europe). As used herein, the word MEMS includes micromachines and micro systems technology.

MEMS mirror arrays have been developed for use in projection displays or TV's, but are typically intended for rendering moving images with high refresh rates and continuous control.

In U.S. Pat. No. 4,710,732 ('732 patent), hereby incorporated by reference as though fully rewritten herein, entitled "Spatial Light Modulator and Method," there is disclosed a spatial light modulator with deflectable metal flaps hinged to conducting posts on a substrate, with the metal flaps and conducting post being connected to addressing circuitry in the substrate. There is no disclosure in the '732 patent of, inter alia, of tamper resistant, single time, hardwired programming circuitry connected to each of the image elements to program the image elements so as to restrict the microelectrical-mechanical device to displaying a predetermined image upon actuation.

U.S. Pat. No. 7,283,112 ('112 patent), entitled "Reflective Microelectromechanical Structure (MEMS) Optical Modulator and Optical Display System," is directed to flat panel displays similar to, for example, liquid crystal displays. The '112 patent discloses a microelectrical mechanical reflector array that includes an array of microelectrical mechanical actuators that support reflectors in alignment with the array of pixel apertures. The array of microelectrical mechanical actuators orient the reflectors selectively to direct the illumination light back through the pixel apertures (to form part of a display image) or against the aperture plate (to be blocked). The illumination light passing back through the pixel apertures pass through the microlens array and a beamsplitter to a display screen. There is no disclosure in the '112 patent of tamper resistant, single time, hardwired programming circuitry connected to the image elements to program the image elements so as to restrict the microelectrical-mechanical device to displaying a predetermined image upon actuation.

U.S. Pat. No. 6,421,013 (hereby incorporated by reference) entitled "Tamperproof Wireless Article Including an Antenna," discloses, inter alia, a wireless ID bag that includes an electronic device mounted on a substrate and connected to an antenna for receiving and transmitting RF signals for communication with a base unit or reader via a radio-frequency (RF) communication link.

U.S. Patent Application No. 2005/0248827 ('827 Application), hereby incorporated by reference, is directed to, inter alia, flat panel optical display systems with increased image clarity and overall image quality discloses a microelectrical mechanical device comprising (a) a substrate; (b) an arm having a first end anchored to the substrate and a free end extending over the substrate, the arm having a bottom surface facing the substrate and a top surface opposite the bottom surface; (c) a reflector extending over the top surface of the free end of the arm; (d) an electrostatic activation electrode supported by the substrate and facing the bottom surface of the arm, the electrode, when activated by a first voltage, providing an electrical force sufficient to move the free end of the arm; and (e) an electrostatic lock, supported by the substrate and facing the bottom surface of the arm, the lock, when activated by a second voltage, providing an electrical force sufficient to hold the free end of the arm in position. There is no disclosure in the '827 Application of a tamper resistant, single time, hardwired programming circuitry connected to each of the image elements to program the image elements so as to restrict the microelectrical-mechanical device to displaying a predetermined image upon actuation.

As stated in the foregoing, in view of the many security concerns in today's society, there exists a need for a single-time, hard-wire programming, tamper-resistant image device which provides multiple uses including identification.

SUMMARY OF INVENTION

A preferred embodiment of the present invention prevents photo substitution or alteration through the use of an embedded dynamic photo ID system comprising a MEMS cantilever array. By assembling the image from physically small, moving elements, the MEMS cantilever array cannot be duplicated without significant investments in capital equipment and micro-fabrication expertise—preventing low-level, poorly funded organizations from covertly replacing/altering the image. Furthermore, the present invention simultaneously takes advantage of economies of scale (like with integrated circuit manufacturing) to keep single element cost down for the producer, with the end user performing a single-time, irreversible programming of each unit.

A preferred embodiment utilizes a series of MEMS devices to project an image. The delicate nature of the physical structures in these dynamic IDs greatly inhibit manual tampering, while their dynamic nature prohibits substitution with a static image (like a printed picture). In contrast to conventional devices, the invention described herein has several distinct advantages, including the following: Dynamic photo IDs (or images) cannot be duplicated with low-cost printing and lamination equipment, significantly raising the capital cost of forgery attempts, (2) Small size and delicacy of components inhibits manual tampering without irreparably damaging image; device performance. No external reader is required for interrogation of embedded photo information as visual inspection using ambient lighting conditions is the intended output, (3) Small mass and movement range requires extremely low amounts of energy to cause desired result (and little control is necessary over the exact angle of deflection), (4) Hard-wired pictures are inherently immune to software/hacking attacks, (5) Embodiments are also envisioned where optical interrogation from a distance would be advantageous, such as using tailored reflector arrays to serve as visual indicators of sensor outputs, enabling remote sensor interrogation via lasers or optics. Each of the preferred embodiments described in this specification can be implemented separately or in conjunction with each other.

Other uses of this technology could include sensor or data interrogation at either short or large distances by using the reflective nature of the image as a sensor indicator. The technology could also be adapted for novelty items where multiple images appear as a result of various inputs (for example, as force-feedback in physical manipulators/tools or as low resolution displays on the surface of toys).

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A and 4B are illustrations of a low-profile packaged reflector array with different cantilever lengths that actuate at progressively large voltages (produced by increasing the mechanical input/force to a piezoelectric in this case). FIG. 4A illustrates a side view of 4 image elements 10B. FIG. 4B is a top view of an array of 20 image elements 10B.

A more complete appreciation of the invention will be readily obtained by reference to the following Description of the Preferred Embodiments and the accompanying drawings in which like numerals in different figures represent the same or corresponding structures or elements. Similar functioning elements are represented using a suffix such as 3A, 3B, or 3C. The representations in each of the figures are diagrammatic and no attempt is made to indicate actual scales or precise ratios. Proportional relationships are shown as approximates.

DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

Figure 1:
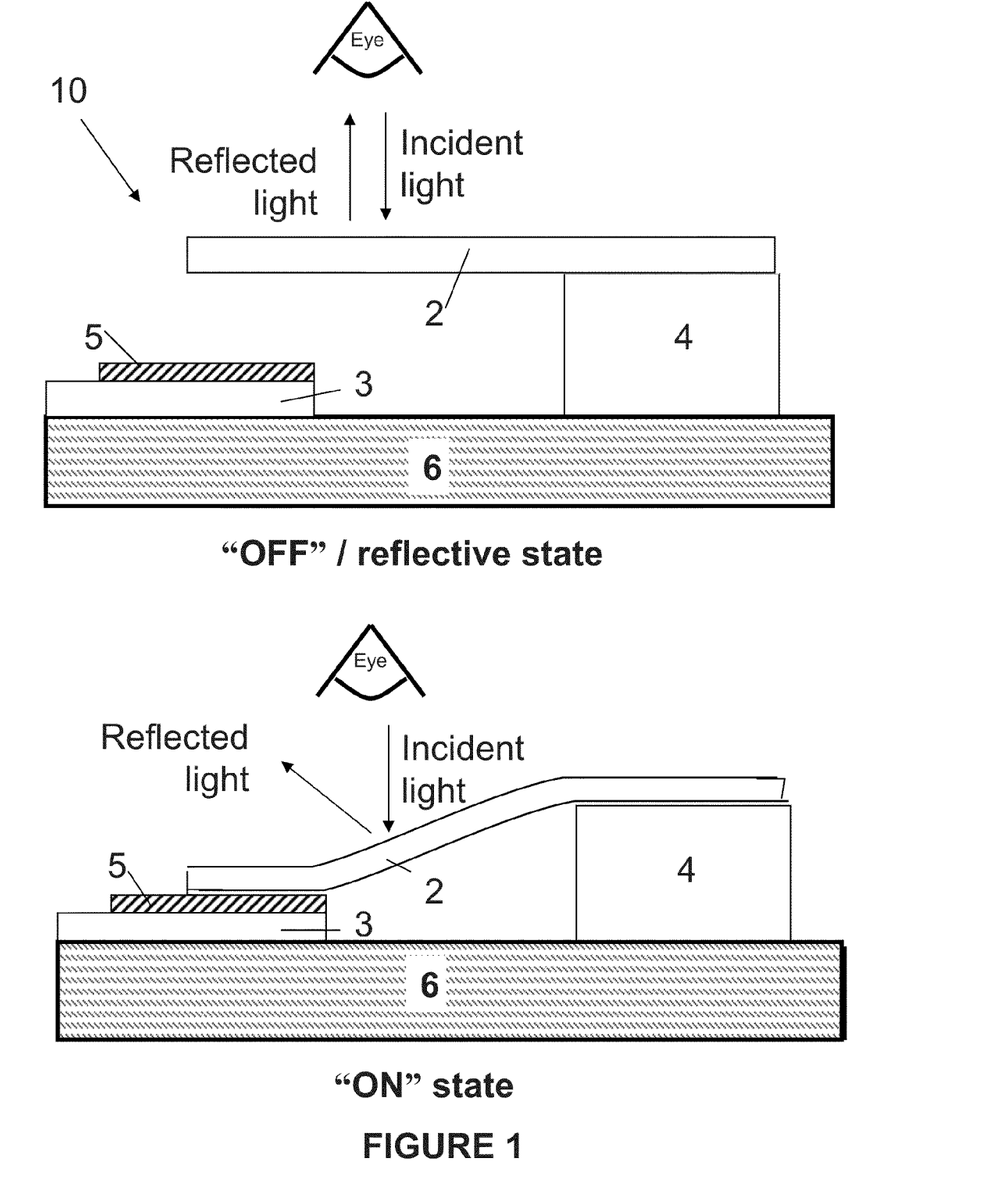
FIG. 1 is a schematic diagram of a generalized reflector element 10.
Figure 1A:
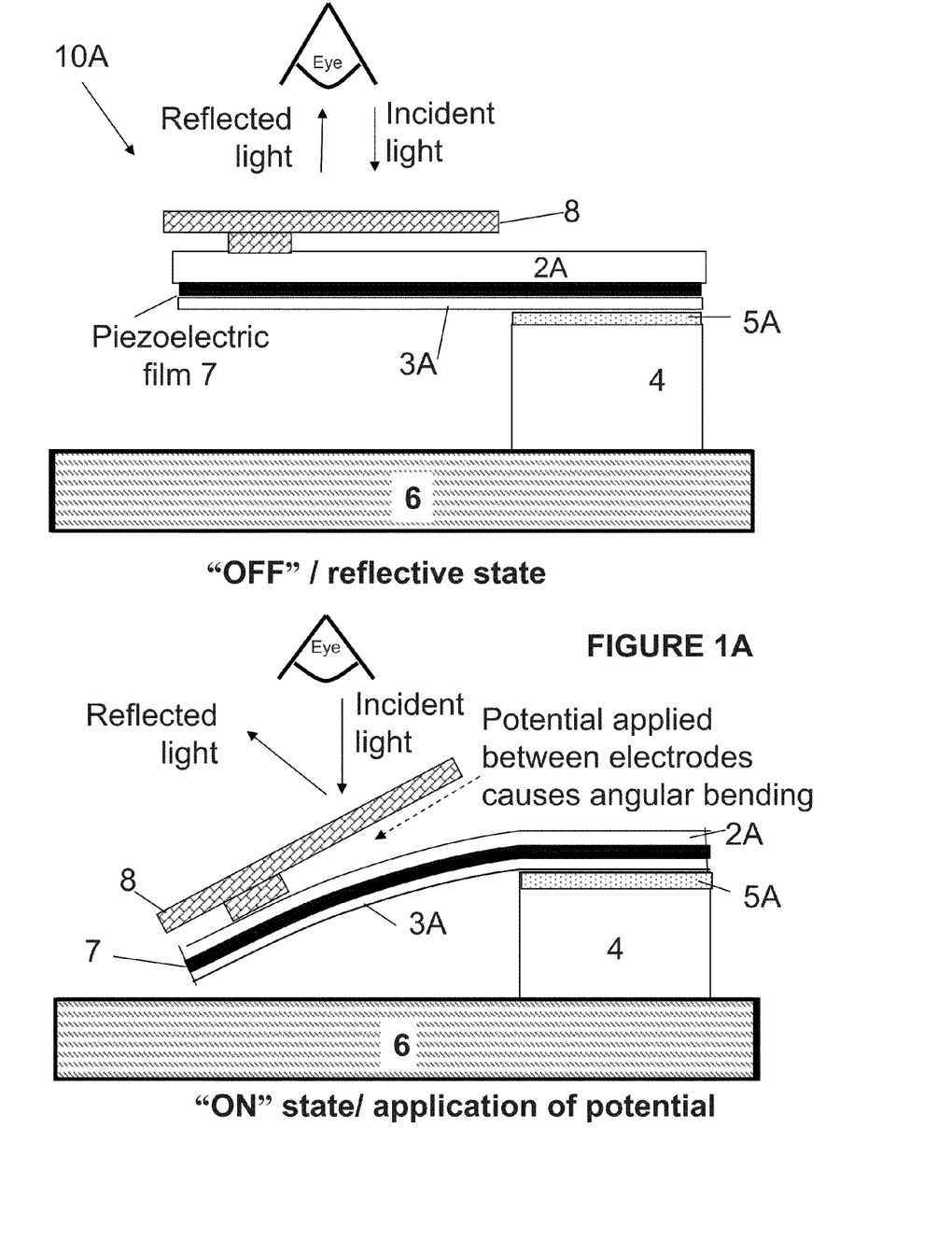
FIG. 1A is a schematic diagram of another preferred embodiment of the present invention incorporating generalized reflector element 10A comprising mirror or reflector surfaces 8.

FIG. 1 illustrates an example of a micro-electro-mechanical (MEMS) reflector element 10 comprising flexible electrode 2, bottom electrode 3, anchor 4, insulator 5, and substrate 6. Substrate or base 6 may comprise plastic or a similar material. For electrostatic actuation, a potential applied across the two electrodes (2, 3) causes the cantilever to turn "On" (incline downward as depicted in FIG. 1) such that incident light will be reflected differently than those devices left "Off." Similarly, FIG. 1A shows an alternative actuation mechanism whereby an optional piezoelectric thin film (7) is used to actuate a mirror surface, in which case the potential is applied across the piezoelectric film via the two electrodes (2A and 3A). In FIG. 1A, the piezoelectric film is the actuation mechanism that creates the movement (wired substantially identical to the electrostatic case of FIG. 1, as both just need a potential applied between two electrodes to cause the mirror or reflective surface to bend). Thus, the top and bottom of FIG. 1A correlate to a before/after (OFF/ON) diagram similar to FIG. 1. By combining many elements 10 or pixels in an array, an arbitrary 2-D reflected image can be created, such as that shown in FIG. 3. For photo replacement applications requiring facial recognition, the number of elements 10 for such a system will approach or exceed the resolution achieved in most standard printers of 300 dots per inch (roughly ~85 µm/pixel) though 150-200 dots per inch may be sufficient for a lower resolution display.

Figure 7:
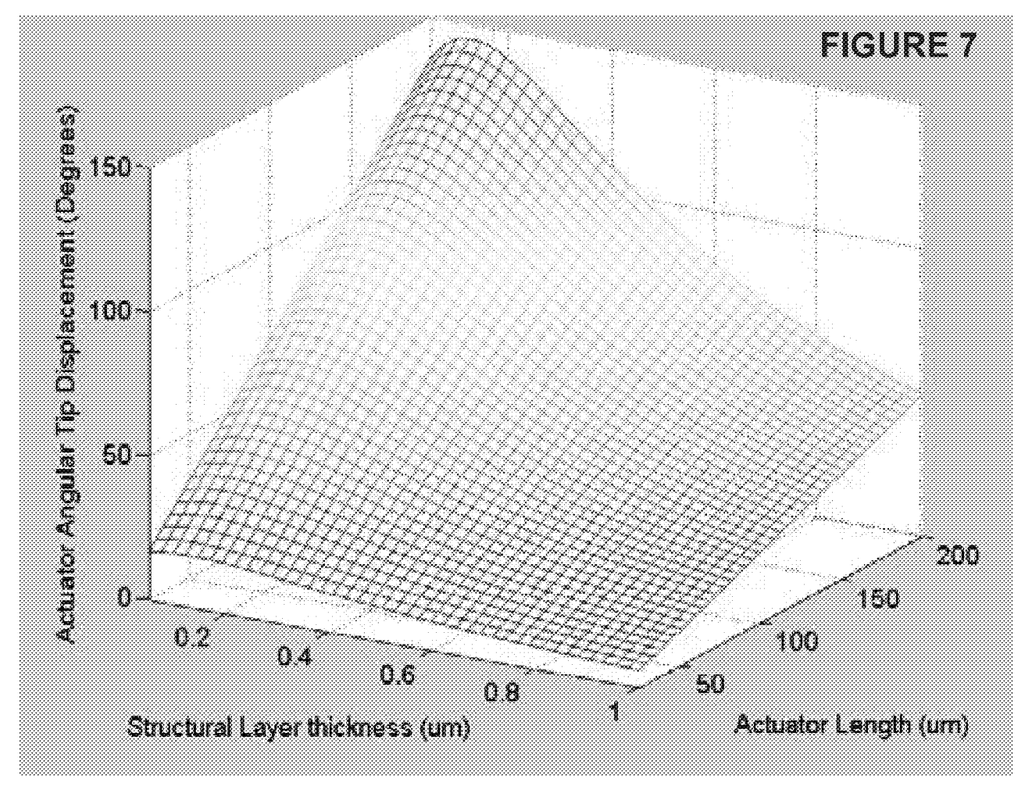
FIG. 7 is a graphical illustration of simulated angular deflection for piezoelectric cantilevers as a function of length and structural layer thickness.

Depending on the intended application and usage (virtually no work being performed by the actuator, precise control over deflection angle not required), the design space available for actuator implementation becomes quite large. Actuator design may be focused on maximizing deflection angle as a function of applied voltage for a given area. Potential capabilities include mirror deflection angle >45 degrees and power consumption of <1 µW for a 1 cm$^2$ array (~1-2 µJ per view). Simulations in FIG. 7 show that basic cantilevers with lengths <200 µm may be easily achieved sufficient tip angle for easy viewability by correctly choosing the structural layer thickness. For more compact designs, torsional actuators utilizing a cascade of cantilevers may be utilized for their additive angular deflection nature (see FIG. 8).

Preferred embodiments of the present invention incorporate fault tolerant design techniques. For example, scaling of single actuators towards highly parallel arrays involves consideration of fault tolerant design features so that a single short circuit failure does not render the entire array inoperable. Protective resistor structures may be incorporated periodically to maintain a voltage drop in case of a short (at the expense of increased power consumption).

Figure 2:
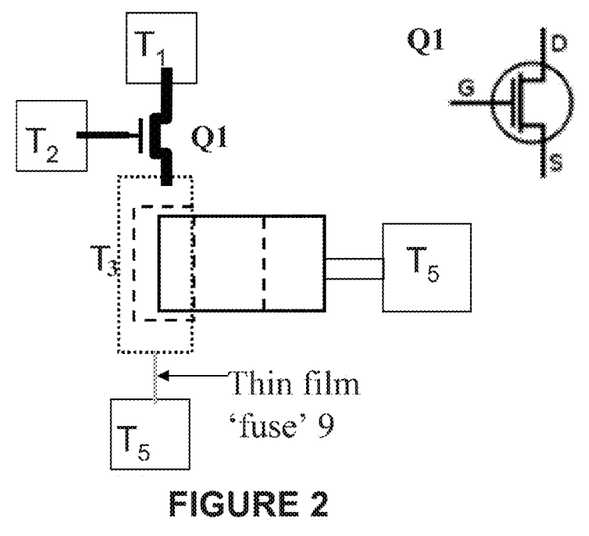
FIG. 2 is a diagrammatic illustration showing an example of the programming of a single reflector element using a current pulse to "blow" a thin film "fuse" 9.

Hard-wire encoding is a security feature of the preferred embodiment dynamic ID (shown in FIG. 5) as an image may be hard-wired using segments or thin film fuses 9 (as shown in FIG. 2). One of ordinary skill in the art could appreciate that alternatives to the removal of the segments or thin film fuses could be utilized; such as circuit breakers, chemical etching, physical removal, etc. At the time of card issue, a series of current pulses would be sent through the array to destroy thin film resistor interconnects beneath particular pixels 10, rendering them permanently 'dead.' It is anticipated that the pulse sequence could be carried out on the order of a few seconds with a computer and probe card. By physically destroying the electrical interconnect by a fuse method (or by physical removal of the segment 9), reprogramming the pixel could only be accomplished by re-wiring the micron-scale path via focused ion beam (FIB) or another expensive and/or slow technique. Multiple fuse and interconnect designs may be utilized to ease initial programming while increasing difficulty of later manipulation (like hiding fuses beneath their mirrors to complicate access).

Those skilled in the art of MEMS will recognize that piezoelectric, electromagnetic, thermal, or other common MEMS techniques could be used to generate similar actuation characteristics (as done in MEMS switches etc). Electrostatic actuation is described herein for simplicity of operation/drive and its inherently low power draw which is attractive for portable applications like ID cards where on-board power solutions are limited. While a cantilever implementation is shown, for example, in FIG. 1, for simplicity, embodiments utilizing other MEMS-type reflectors can be substituted without departing from the spirit of the invention with potential tradeoffs in design, fabrication, performance, and/or reliability. Among the many possibilities beyond simple cantilevers, though not a complete list, are: doubly-clamped beams, periphery-supported membranes, hinged mirrors, and ribbon diffraction gratings.

FIG. 1A is an illustration of another preferred embodiment of the present invention. Associated with the top electrode 2A is an optional mirror or reflective elements 8. Alternatively, the reflector elements 8 may be part of a flexible substrate (rather than traditional silicon) to create a flexible display. Optionally, the flexible covering may be transparent and placed over the reflective elements 8.

Figure 3:
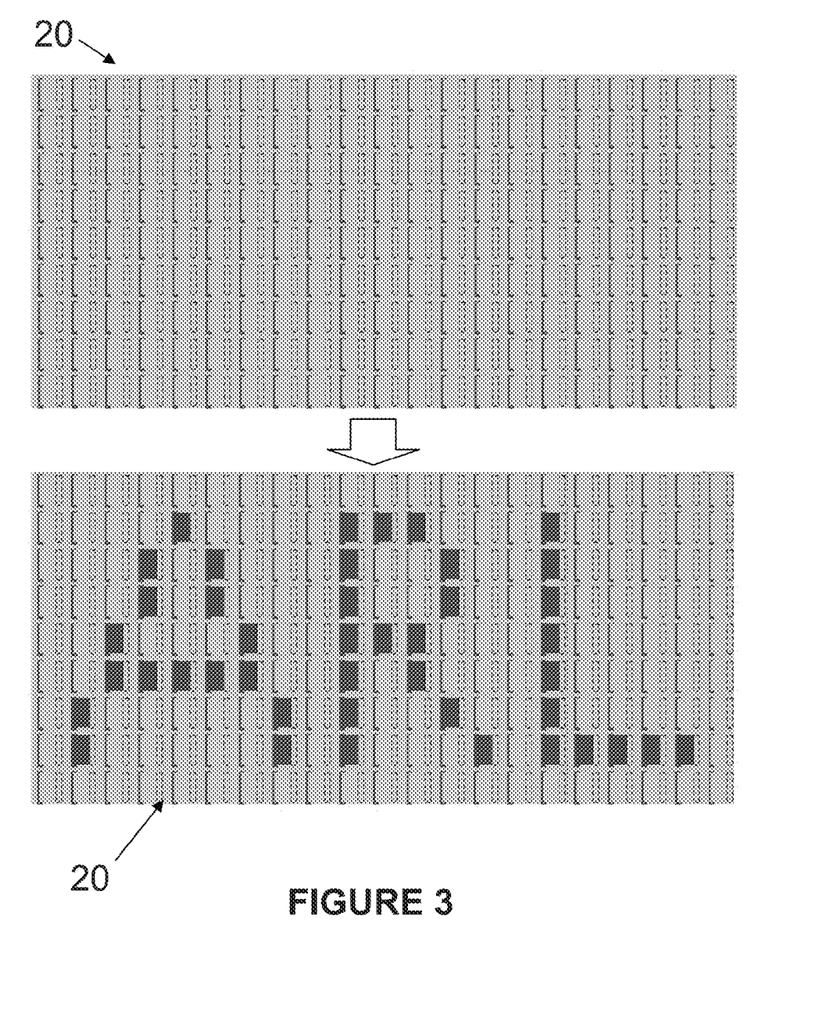
FIG. 3 is an illustration of a reflector array 20 before and after actuation to reveal a hard-wired image.

In the "OFF" position as shown in the top portion of FIG. 1A, incident light perpendicular to the base 6 is reflected back in a direction perpendicular to substrate or base 6 into the eye of the observer as indicated by the arrows in FIG. 1A. As shown in FIG. 1A, an insulator 5A is used as isolation between anchor 4 and bottom electrode 3A and a piezoelectric film 7 is mounted between the top electrode 2A and the lower electrode 3A. When the element 10A has voltage potential applied between the electrodes 2A and 3A, the element 10A is in the "ON" state. As shown in the lower portion of FIG. 1A, the subassembly comprising the electrode 3A, piezoelectric film 7 and electrode 2A bend downward as a voltage potential is applied, so as to change the incidence of reflection for mirror 8. As illustrated by the arrow in FIG. 1A, the pixel represented by element 10A appears "dark" as reflected light is no longer is reflected into the eye of the observer. Similarly, as seen in FIG. 3, the pixels forming the letters "ARL" are "dark" pixels. In regard to FIG. 5, the "ON" state of the pixels forming the darkened facial area in the image 20A correlates to the "ON" state shown in the lower portion of FIG. 1A.

Figure 2A:
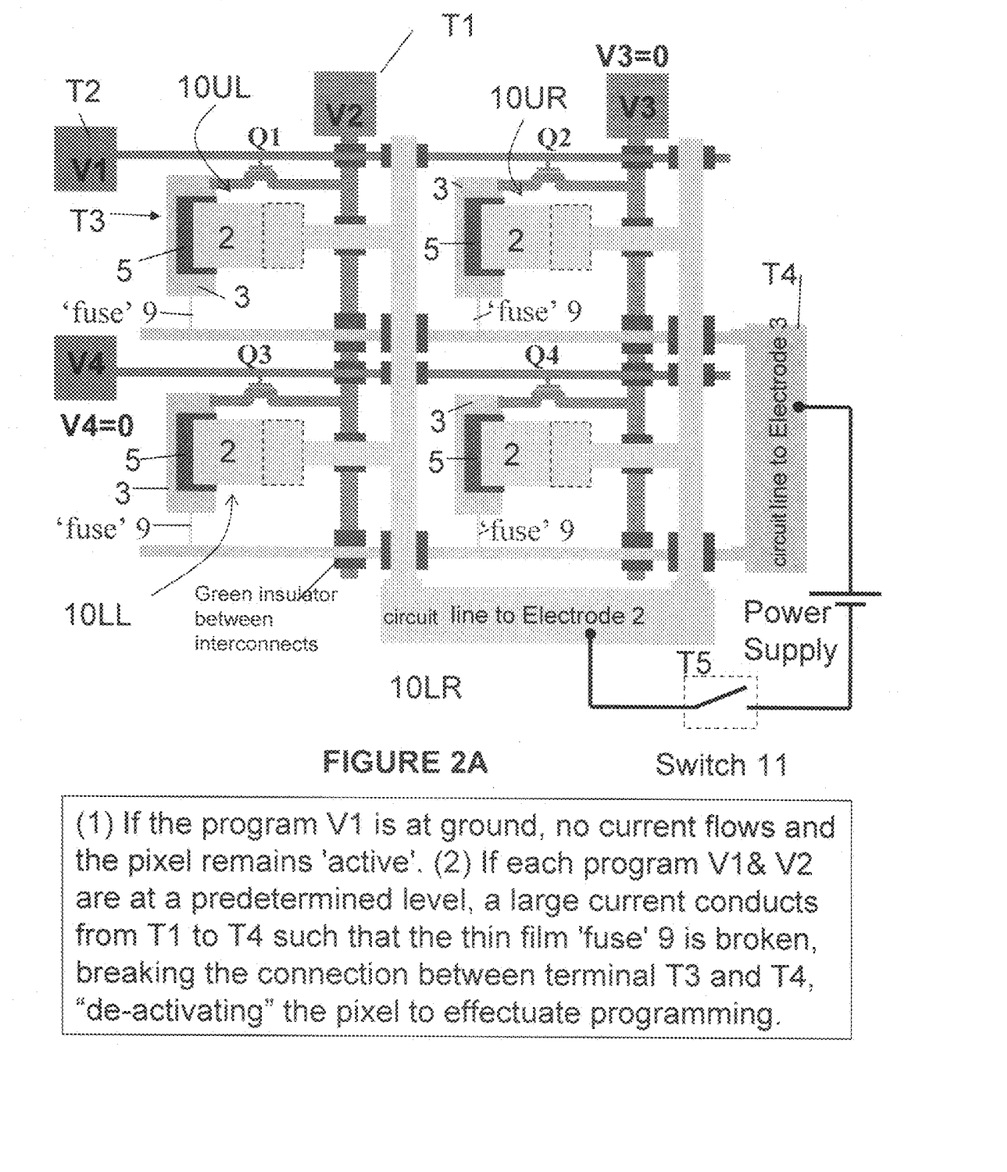
FIG. 2A is a schematic drawing showing the circuitry for an array of elements, power supply, and switch 11.

FIG. 2 is a schematic illustration of an exemplary method of achieving irreversible hard-wiring. The image elements or unit cells 10, 10A and 10B shown in the preferred embodiments herein are preferably between approximately 50 μm and 500 μm in length, although devices outside of this range could be utilized without departing from the scope of the present invention. Similarly, the bottom electrode 3 and anchor 4 are preferably in the range of approximately 10 μm and 100 μm, and the insulator 5 may be preferably in the range of approximately 0.1 μm and 2 μm. Similarly, the substrate 6 may be preferably between approximately 50 μm and 500 μm long and between approximately 10 μm and 500 μm thick. It can be readily appreciated by those skilled in the art that the foregoing size ranges are exemplary and may to expanded without departing from the scope of the present invention. To program this image element or unit cell 10, a potential "V program" (V2 in FIG. 2A) is applied across terminals T1 and T4. As depicted in FIGS. 2 and 2A, the value of V program is chosen such that when a transistor, for example a MOSFET Q1, is turned on by applying a high voltage V1 to T2, one of two possible outcomes occurs: (1) If V program=ground, no current flows and the pixel remains 'active'. (2) If V program=high, a large current conducts from T1 to T4 such that the thin film 'fuse' 9 (an extremely narrow metal trace defined via lithography) is destroyed, breaking the connection between terminal T3 and T4, "de-activating" the pixel. Connections to terminals T1 and T2 may then permanently removed. The actuation or activation voltage is applied across terminals T4 and T5, but only on 'active' pixels will the applied voltage appear across terminals T3 and T5, actuating the pixel 10. Note that terminal T5 may be grounded during actuation so that "deactivated" pixels 10 do not self actuate due to induced image charges on an isolated electrode T3. Similar programming architectures (and/or addressing circuitry) can be envisioned where the current pulse is controlled through diodes or multiple switches, however the principle remains the same.

FIG. 2A depicts a potential interconnect and programming scheme for an array of pixels 10. The interconnecting circuit lines to the top electrodes 2 (shown in yellow) and bottom electrodes 3 (shown in grey) correlate to addressing circuitry, whereby each pixel in the array of four pixels 10 (10 UL upper left, 10 UR upper right, 10 LL lower left and 10 LR lower right) may be separately energized. The programming circuitry is represented by the red and blue lines shown in FIG. 2A. In the example shown in FIG. 2A, the upper left pixel 10 is deactivated (or programmed) by the applied potentials V2 to T1 (blue) and V1 to T2 (red line connected to gate of transistor) thereby turning on Q1 to cause a large current to flow through fuse 9 to the grounded interconnect line T4 to break the thin film fuse 9 (breakage not shown). It is envisioned that a probe card could be used to quickly sequence the appropriate voltages at all T1 and T2 connections for programming each image element or pixel 10. Voltage potentials (such as for example V1, V2, V3 and V4) are applied to the red and blue colored boxes or lines in FIG. 2A. The red lines connect to the gate terminals of each of the transistors shown in FIG. 2A. The blue lines interconnect with the transistor terminals (drain and/or source for an FET) of each transistor Q1 to Q4 when each gate (or base) receives the required activation potential. Electrodes 2 are interconnected by the yellow circuit lines which in turn are connected to T5. Electrodes 3 are interconnected by the grey circuit lines which in turn connect to T4. After programming the entire array, an actuation voltage is applied across T4 and T5 (upon closure of switch 11) that will simultaneously actuate only the 'alive' pixels 10. Insulator between contacting points, lines or surfaces are represented by the color green. While this programming architecture has been described for an electrostatic implementation, those skilled in the art will recognize that this is but one example architecture for one example actuation mechanism and other programming and/or actuation mechanisms can be easily envisioned without departing from the scope of this invention.

FIG. 3 is an illustration of an image device with a hard-wire encoding which can be used in a picture ID or the like. The dynamic array 20 of reflector (image) elements 10 that reveal the image when a stimulus (like voltage, pressure, etc) is applied. Each reflector (image) element 10 in the array 20 receives a single-time hard-wire programming by the user to encode the exact pattern of 'active' and 'inactive' pixels, such that only 'active' pixels are affected by the external stimulus, revealing the encoded image. This is in direct contrast to existing MEMS displays where each pixel is actively controlled to generate moving pictures/video, as well as to the existing approaches where a static photograph is used.

Figure 4A:
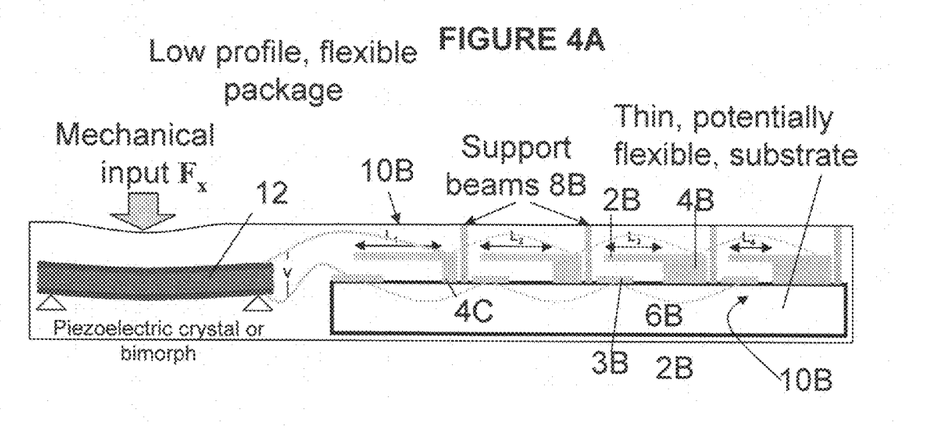
Figure 4B:
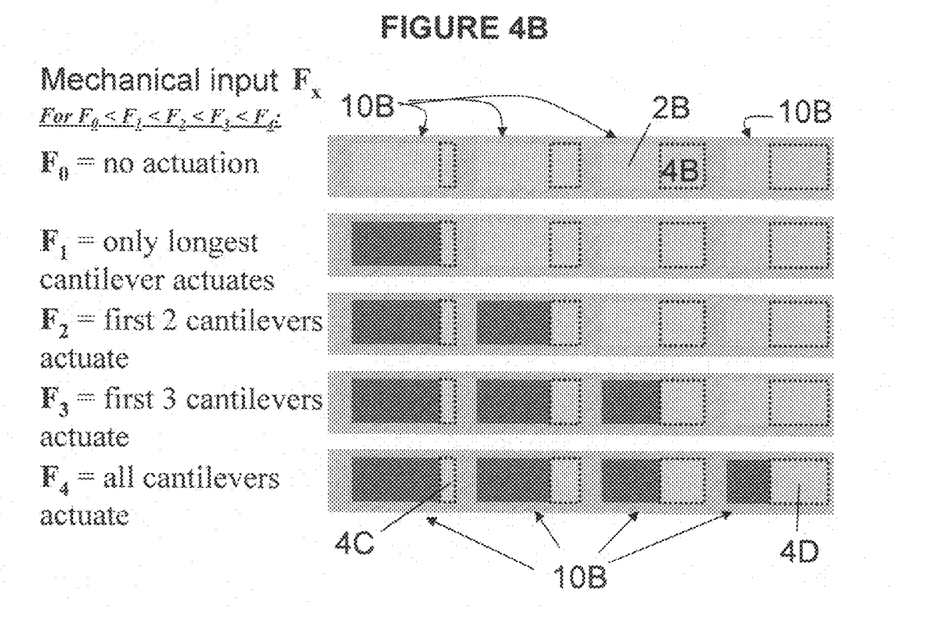

FIGS. 4A and 4B illustrate an array of elements 10B in various actuation states. In FIG. 4A, there is shown a cross section of a row of four elements 10B each having a support beam 8B. The assembly is based on a thin, potentially flexible, substrate 6B. Although for simplicity only certain of the image elements 10B are numbered in FIGS. 4A and 4B, the numbering is applicable to all four image elements in the cross section shown at the upper portion of FIG. 4 and each of the four image elements shown in the five rows depicted as $F_0$, $F_1$, $F_2$, $F_3$, and $F_4$ in the corresponding top view of the elements.

As shown in FIG. 4B, $F_0$ depicts a row of four elements 10B wherein no cantilevers are actuated. $F_1$ depicts a row of four elements 10B wherein only the longest cantilever is actuated. $F_2$ depicts a row of four elements 10B wherein two cantilevers are actuated. $F_3$ depicts a row of four elements 10B wherein three cantilevers are actuated. $F_4$ depicts a row of four elements 10B wherein all cantilevers are actuated. Shown to the left in the upper portion of FIG. 4 is a piezoelectric crystal of bimorph 12, which is shown as being impacted by a mechanical input. This correlates to the on switch shown by the power button in FIG. 5. It can be readily appreciated by those of ordinary skill in the art that other switching devices could be utilized without departing from the scope of the invention. Also shown in FIGS. 4A and 4B are image elements 10B comprising a top electrode 2B, a bottom electrode 3B, a support 4B and a substrate or base 6B. FIGS. 4A and 4B also illustrate the variation of the dimensions of supports 4B-4D to effectuate an increased darkened area (4C) or decreased darkened area (4D).

Another feature which may be implemented in a preferred embodiment of the present invention is a universal ON/OFF (two-state) control architecture for each pixel in the array, where all active pixels are actuated simultaneously to reveal their single-time programming of the image. The exact angle of deflection from one 'active' pixel to the next is largely unimportant so long as the reflective state is significantly different from de-activated pixels. Multiple fuses and gate electrodes could be integrated to store/display multiple images.

It can be appreciate by those of ordinary skill in the art that the X-Y array of pixels may be any number of rows and columns and may be controlled by programming or addressing circuitry; such as, for example, addressing circuitry resembling that disclosed in U.S. Pat. No. 4,710,732, hereby incorporated by reference as though fully rewritten herein.

Another feature which may be implemented in a preferred embodiment of the present invention, as shown in FIGS. 4A and 4B, is the implementation of power sources and dynamic reflector elements into a single, low-profile package (such as an ID card). The potential voltage/power sources include thermoelectric generators, thin-film batteries, electric generators, or piezoelectric crystals or bi-morphs (12 as shown in FIG. 4A). Such technologies could potentially be fabricated on a single substrate or hybrid packaged in a thin profile (mm to sub-mm scale) format, as shown for example in FIG. 4A.

Figure 5:
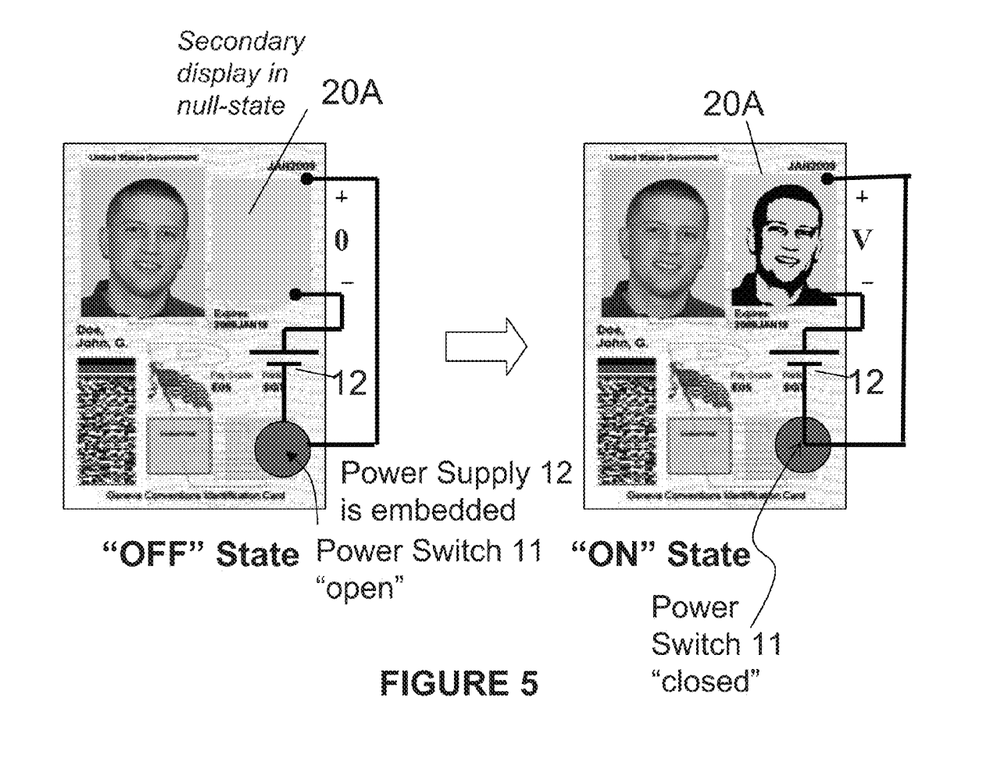
FIG. 5 is a schematic illustration showing an embedded array of MEMS reflectors that reveal a hard-wired image that substantially matches or resembles the photographic headshot when an external stimulus is applied. "OFF" State vs. "ON" State Power button Secondary display in null-state Power applied Secondary image appears.

FIG. 5 illustrates a preferred embodiment of the present invention comprising an embedded micro-electro-mechanical (MEMS) reflector array 20 (embedded) which displays a photographic image 20A upon actuation of the power button or switch 11. Optionally, the embodiment shown in FIG. 5 may include a battery (preferably embedded) which powers the array 20A from an "OFF" state shown to the left of FIG. 5 to an "ON" state shown to the right in FIG. 5. It can be readily appreciated by those of ordinary skill in the art that the photographic image 20A could be a variety of images such as an insignia of secret key. In the application illustrated in FIG. 5, the photographic image in the left corner of the ID card of the person shown in the "OFF" state may be subject to tampering or replacement in order to provide an unauthorized user with a false ID. However, the image 20A which resembles the photograph, could not be changed without destroying the hardwired circuitry of the pixel array that forms the image 20A. Thus, the correlation of the image 20A with the photograph provides reasonable certainty that the photograph appearing to the left has not been altered; thereby preventing identity theft.

Another feature which may be implemented in a preferred embodiment of the present invention is the use of external inputs to cause a change in applied voltage (or stimulus) to the array. Physical pressure/force could be used to close a switch to a battery, or deflect static (or resonant) piezoelectric or electric generators. Thermal gradients (from a human, flame, or other heat source) could be directly converted into voltage via the thermoelectric effect. For photo ID's, once the applied voltage reaches a critical level, all "active" reflector elements will actuate simultaneously, revealing the pre-programmed image.

As an alternative to the powered embodiment of FIG. 5, the battery or power switch 11 could be replaced by remote actuation by an external device which energizes the pixels to an "ON" state using a remote, externally supplied, energy source or signal emitted from a unique signal generator.

Figure 6:
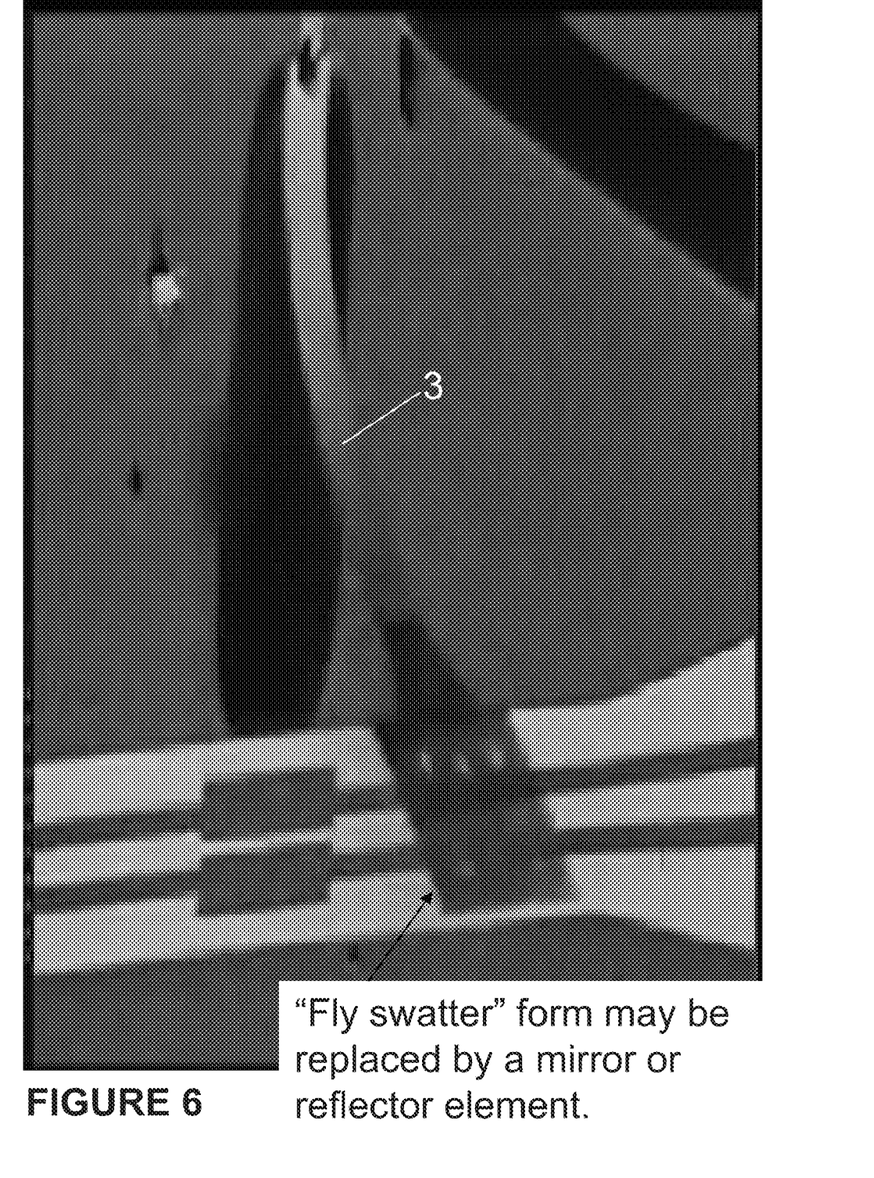
FIG. 6 is a photographic illustration of a MEMS cantilever switch.

FIG. 6 is a photographic illustration of a MEMS cantilever switch comprising a flexible electrode 3. In the photograph, an image resembling a "fly swatter" pattern appears. This "fly swatter" pattern may be replaced by a reflective surface or have a mirror or reflective surface mounted thereon.

Figure 8:
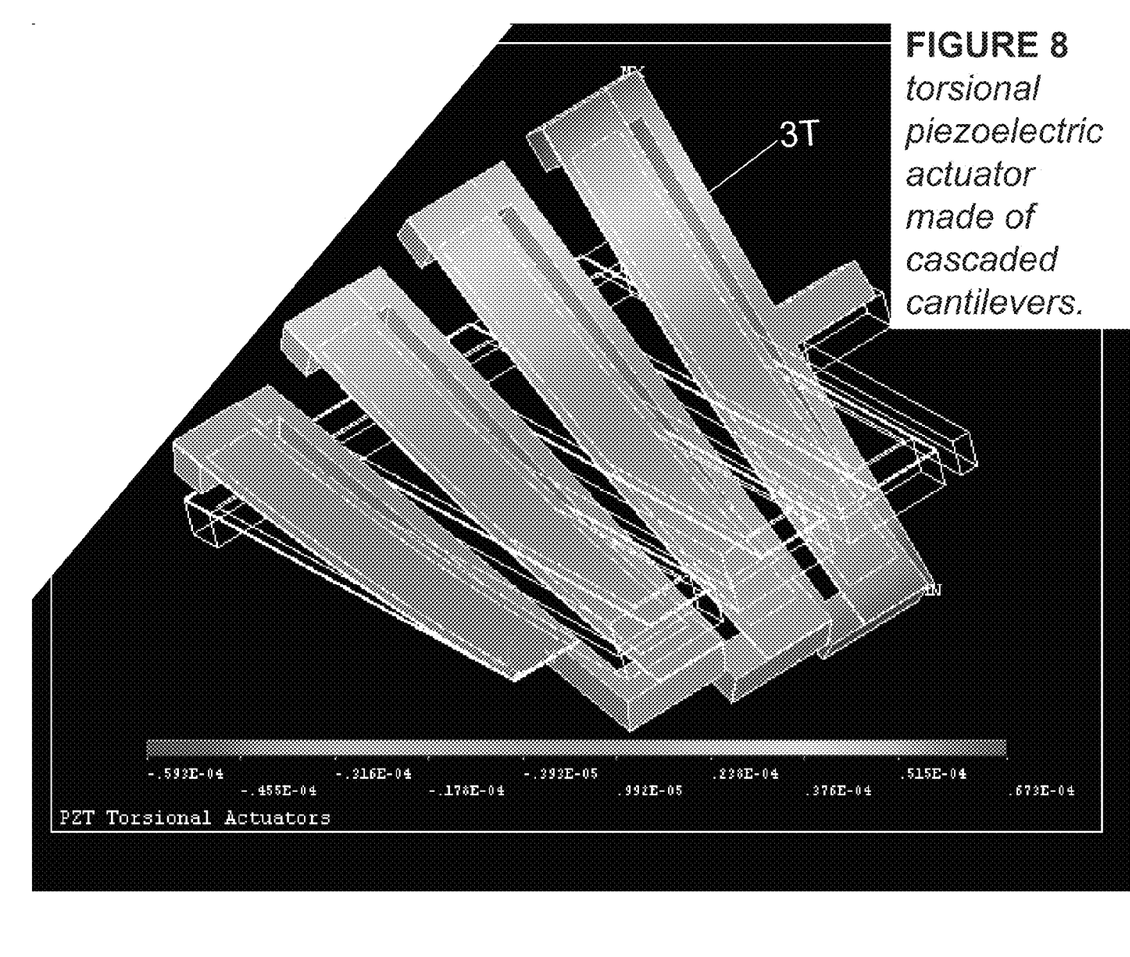
FIG. 8 is an illustration showing the simulation of a torsional piezoelectric actuator made of cascaded cantilevers.

Another optional feature which may be implemented in a preferred embodiment of the present invention is to operate a similar reflector array as a remotely interrogated sensor display/indicator, where a progressively increasing input/voltage causes successive actuation of reflective elements to indicate the magnitude of the input (see FIG. 8). Such an embodiment could be easily implemented using geometry of the reflector elements. For example, the successively shorter cantilevers in the figure require different voltage levels for actuation. Remote visual sensor interrogation is achieved by identifying which reflector elements have been actuated because the voltage applied to that array is correlated to the input force magnitude.

Another feature which may be implemented in a preferred embodiment of the present invention is to directly print/fabricate dynamic reflector elements onto an existing ID substrate. This approach provides further tamper-resistance, as the reflector array on one card cannot simply be 'cut out' and replaced by a different reflector array obtained and programmed separately. Alternatively, the secondary display may be formed by alternative technology (LEDs, LCD's, e-ink, etc.) using general thin display technologies where the image is hard wired with fuses as in the example shown in FIG. 2A, or where the image is encrypted in a driver chip also on the card or substrate. The power source (either a thin battery or potentially a piezoelectric or other generator/scavenger) preferably is embedded in the substrate or card.

Another feature which may be implemented in a preferred embodiment of the present invention is the incorporation of the reflector elements onto a flexible substrate (rather than traditional silicon) to create a flexible display of the type described above. The simplistic design and fabrication of the reflector elements using surface micromachining provides this flexibility in manufacturing, allowing for rigid or flexible, expensive or cheap, substrates depending on application requirements. Flexible implementations may be attractive particularly in a novelty market such as toys, while expensive rigid substrates may be desired for increased complexity or integration of electronics.

Another feature which may be implemented in a preferred embodiment of the present invention is the use of support posts or beams 8B between said reflector elements to prevent routine handling of the device from collapsing the package into the fragile reflector elements, as shown in FIG. 4.

Photographic identification cards are a nearly universal technique for identity verification. Applications range from limiting personnel access to numerous types of property (rooms, flights, etc) to verifying identity for participation in public, private, or events (like voting, driving, drinking alcohol). The ability to embed a dynamic photograph or image in such cards would provide the user unparalleled security and confidence that the card has not been altered nor forged and remains in its original state for comparison to the bearer of said card. Concepts similar to those presented in the embodiments described herein could also be extended to embedded sensing capability where visual displays correlate directly to sensor input. One possibility would be a self-powered pressure sensor node that causes successive mirrors to pull down with increasing applied force, resulting in an optically interrogated signal directly correlated to the pressure/force applied to the sensor (see FIG. 4). Small scale displays on novelty items could easily be envisioned where company logo's and the like are alternately displayed based on simple user inputs like pressure or temperature.

A preferred embodiment of the present invention utilizes the concept of an array of MEMS-type reflectors (or similar devices) to display a hard-wired photo ID (or other image) upon actuation. The reflector array may comprise either single or multiple hard-wired images (or indicator patterns) that are displayed based on a single (or multiple) input(s). The hard-wire encoding of said image through a single-time high current pulse to destroy thin film resistor interconnects is resistant to tampering. At least one preferred embodiment incorporates surface or bulk micro-machinable MEMS reflector arrays where the reflective elements are doubly clamped beams, simply-anchored cantilevers, peripherally supported membranes, hinged mirrors, ribbon diffraction gratings, or other common MEMS elements. At least one preferred embodiment utilizes actuation for moving said MEMS reflectors between two distinctive states simultaneously using an integrated actuation mechanism as depicted in FIG. 4, for example. Although electrostatic actuation may be preferred, other options include piezoelectric, magnetic, thermal, or other common MEMS actuation approaches. The layout of said reflector array in a thin film implementation is particularly an option for incorporation into a slim profile package such as a driver's license, credit card, etc.

An additional optional feature of the present invention is the integration approach for including a thin profile power source for mechanically stimulated generation of actuation signal to said reflector arrays; such as for example, integrated circuits, piezo elements, or thermoelectrics for producing an electrical signal. The reflector array may be fabricated directly onto an ID card (as shown in FIG. 5) or other substrate to prevent array-swapping. Optionally, the integration of said reflector array 20 onto either rigid or flexible substrates 6 such as, for example plastics or reinforced paper, depending on application requirements (such as desire for integrated electronics, tamper resistance, or exceedingly cheap manufacturing). The reflector array 20 may be adapted as a visual indicator for mechanically or electrically induced sensor output can be remotely interrogated. Moreover, the incorporation of integrated protection features (such as supports or beams 8B) prevent damage to reflector arrays during packaging/covering of the device.

As shown in FIG. 5, an embodiment of the present invention may comprise a secondary dynamic display 20A for secure ID cards based on an array of piezoelectrically-driven MEMS mirrors. At the time of ID card issue, each reflector element in the array will receive an irreversible hard-wire programming by the issuer to encode a pattern of 'alive' and 'dead' pixels that corresponds to the primary photo of the card bearer. Under an applied stimulus (i.e. squeeze a 'power button' 11), a voltage is applied to the 'alive' pixels to reveal the encoded image. By comparing the image created by the hard-wired MEMS mirror array with the adjacent printed photo, one can quickly and easily determine if the photo has indeed been tampered with. The security benefits of such an approach are three-fold: (1) Delicate nature of the physical structures makes manual manipulation nearly impossible; (2) Irreversible hard-wiring using thin-film fuses prevent re-programming of the array; and (3) Dynamic behavior prohibits substitution with cheap static images (like a printed picture), significantly raising the capital equipment costs of forgery attempts.

The actuator technology for this dynamic secured ID concept is the use of low power, large displacement, thin film piezoelectric MEMS actuators; such as those used in various PZT MEMS devices, including RF switches (see FIG. 6), resonators, micro-robotics, and energy harvesters. The actuators are capable of maximizing angular deflection for each pixel to achieve high contrast in the resulting image. Pixel sizes should approach the resolution achieved in many standard printers of 300 dots per inch (nominally ~85 µm/pixel), though 150-200 dpi may be sufficient for this 'secondary' display. Given the intended application and usage (no work being performed by the actuator, precise control over deflection angle not required), the design space available for actuator implementation becomes quite large. Actuator design will focus on maximizing deflection angle as a function of applied voltage for a given area. Initial performance targets include mirror deflection angle >45 degrees and power consumption of <1 µW for a 1 cm2 array (~1-2 µJ per view). Simulations in FIG. 8 show that basic cantilevers with lengths <200 µm should easily achieve sufficient tip angle for easy viewability by correctly choosing the structural layer thickness. For more compact designs, torsional actuators utilizing a cascade of cantilevers actuators may be utilized for their additive angular deflection nature (as shown in FIG. 8). Moreover, multiple color tones for color images may be produced using mechanical gratings, color filters, or mechanical displacement effects that correlate to the actuator angular tip displacement degrees as depicted in FIG. 7. Such multiple color tones provide additional security in that the angular tip displacement would provide increased protection against modification by those interested in identity theft. Moreover, remote external sensors could be used in conjunction with the embodiments of the present invention to power or detect changes or modifications in the ID card or imaging device.

As shown in FIG. 5, an advantage of the present invention is capability of providing the low profile on-board power source for dynamic ID card implementation. Numerous potential voltage/power sources may optionally be used, starting with piezoelectric generators (i.e. piezo 'button') and thin-film batteries. Applications will depend in part on power consumption levels and voltage requirements for each chosen format. Optionally, as shown in FIG. 4, an external stimulus of pressure applied between the thumb and forefinger may drive piezo or electric switch requirements.

Additional features may include embedded integration with plastic ID card substrates to prevent original array replacement with another 'drop-in' array; advanced fuse and actuation mechanisms to enable multiple hard-wired images such as front and side-profile shots depending on the stimulus; modified fabrication flows to include supports between pixels to act as "tent posts" that prevent collapse of an overlaid laminate above each mirror; partial-angle actuation techniques to create low-order gray-scale images.

It should be emphasized that the above-described embodiments are merely possible examples of implementations. Many variations and modifications may be made to the above-described embodiments. All such modifications and variations are intended to be included herein within the scope of the disclosure and protected by the following claims. The term "processor" or "computer" as used herein includes multiprocessors, computers, supercomputers, data processor, laptops, signal processors, personal computers, notebook computers, and/or any component which processes data. The term "image generator" as used herein includes a "MEMS" device or array which generate images and/or any element or component, including components within the MEMS structure, which generate images which may be used as a screen or monitor. The abbreviation RF or rf is used for radio frequency or a radio frequency signal. The term "subject" as used herein means a person, human or animal. As used in the following claims, the term "power source" may include a battery, piezoelectric crystal, signal source, signal generator, antenna, and/or electromagnetic wave generating source such as radar, radio or the like. It can be readily appreciated by those of ordinary skill in the art that the signal emitted by the signal source may be unique, pulsed. encoded and/or random.

As used in the following claims, the terminology "permanent" or "permanently" used in conjunction with a feature means that that feature is very difficult to change, or destroy. The terminology "the programming circuitry programs the image elements permanently" means that the programming is "hardwired" and cannot be changed without construction or reconstruction of circuitry or wiring. The terminology "hardwired" means to connect components by electrical wires or conductors or through logic circuitry that is permanently connected within a device. The terminology "permanently in the inactive state" means that the element is "hardwired" so that it cannot be activated without construction or reconstruction of circuitry or wiring through which the image element may be activated. The terminology "tamperproof" as used herein means that the apparatus is built to deter or detect unauthorized access to apparatus or circumvention of a security features of the system or apparatus; e.g., this would include an apparatus with a tamper-evident system.

The invention claimed is:

1. A device for generating an image comprising:
a substrate;
an array of image elements operatively connected to the substrate, each image element comprising first and second electrodes,
the first and second electrodes adapted to be connected to a power source;
each of the image elements having an inactive state in which the image elements operate to reflect light in a first direction when no voltage potential is applied to the first and second electrodes; and an active state where the image element reflects light other than the first direction when a voltage potential is applied to at least one of the first and second electrodes;
programming circuitry connected to each of the image elements to program whether or not the image element is in an active or inactive state; the programming circuitry comprising a switch, a first terminal operatively connected to the actuating terminal of the switch; a second terminal operatively connected to a second terminal of the switch; and a frangible element connected to one of the first or second electrodes; the programming circuit being such when determined voltage potentials are applied to the first and second terminals, the current flowing through the switch causes the frangible element to melt and thereby deactivate the pixel such that it will remain in the inactive state when the activation circuitry receives power from a power source;
activation circuitry interconnecting at least one of the first or second electrodes; the activation circuitry adapted to be connected to a power source;
whereby when the activation circuitry receives power from a power source, the image elements in the array which are not in an active state will reflect light in predominately in a first direction; and those image elements in an active state will reflect light predominately in a direction other than the first direction to thereby display an image.

2. The device of claim 1 wherein the programming circuitry programs the image elements permanently.

3. The device of claim 1 wherein the switch is a transistor and the actuating terminal is the gate of the transistor.

4. The device of claim 1 wherein the light reflected by the image element is reflected by a reflective surface operatively associated with the first electrode; and when a voltage is applied to the activation circuitry, the first electrodes of the active image elements will bend in a direction substantially towards the location of the second electrodes and the first electrodes of the inactive image elements will remain substantially unchanged.

5. The device of claim 1 wherein a piezoelectric layer is positioned between the first and second electrodes; whereby when a voltage is applied to the activation circuitry, at least a portion of the first electrodes of the active image elements will bend in a direction substantially towards the substrate and the first electrodes of the inactive image elements will remain substantially unchanged.

6. The device of claim 1, wherein the substrate is plastic and the image elements are embedded in an identification card.

7. The device of claim 1 wherein each of the first electrodes comprises a flexible metal having a reflective surface associated therewith, whereby when a voltage is applied to the activation circuitry, the flexible metal flexes so as to change the angle of reflection of the light impinging thereon.

8. The device of claim 7, wherein when a voltage is applied between the first and second electrodes for each of the pixels in the array, an image is created by differences in the reflection angles of the first electrodes in the active image elements.

9. The device of claim 1, wherein each of the first electrodes comprises a flexible metal having a reflective surface associated therewith, the metal flexing whereby when a voltage is applied to the activation circuitry, the flexible metal flexes so as to change the angle of reflection of the light impinging thereon.

10. The device of claim 1 wherein each of the first electrodes comprises a surface which reflects or diffracts multiple color tones depending upon the displacement of the first electrodes.

11. The device of claim 10 wherein the surface comprises a diffraction grating.

12. The device of claim 1 wherein the activation circuitry can only be activated by a remote source.

13. The device of claim 1 wherein the substrate comprises a piezoelectric crystal which provides a voltage potential to the activation circuitry.

14. A portable identification device comprising:
   a flexible plastic substrate;
   at least one image element embedded in the substrate, the at least one image element being connected to first and second electrodes,
   the first and second electrodes adapted to be connected to a power source;
   programming circuitry connected to the at least one image elements to program a predetermined image into the at least one image element;
   at least one transparent tamper-proof cover permanently mounted to the flexible plastic substrate completely covering the at least one image element; such that the image displayed by the at least one image element cannot be changed without damaging the tamper-proof cover;
   activation circuitry interconnecting at least one of the first or second electrodes; the activation circuitry adapted to be connected to a power source;
   whereby when the activation circuitry receives power from a power source, the at least one image element displays a predetermined image.

15. The device of claim 14 wherein the programming circuitry comprises a switch, a first terminal operatively connected to the actuating terminal of the switch; a second terminal operatively connected to a second terminal of the switch; and a frangible element; the programming circuitry being such when predetermined voltage potentials are applied to the first and second terminals, the current flowing through the switch causes the frangible element to melt and thereby deactivate the pixel such that it will remain in the inactive state when the activation circuitry receives power from a power source.

16. The device of claim 14 wherein there is a plurality of image elements each comprising a first electrode wherein the surface of the first electrodes is reflective, and wherein the image displayed by the at least one image element cannot be changed without damaging the tamper-proof cover and the image element protected by the tamper proof cover.

17. An apparatus containing a tamperproof image comprising:
   a substrate;
   an array of image elements operatively connected to the substrate, each image element comprising first and second electrodes, the first and second electrodes adapted to be connected to a power source;
   activation circuitry interconnecting at least one of the first or second electrodes; the activation circuitry adapted to be connected to a power source;
   each of the image elements having an inactive state in which the image elements operate to reflect light in a first direction when no voltage potential is applied to the first and second electrodes;
   programming circuitry connected to each of the image elements operating to program the array to display an image when a voltage is applied to die activation circuitry by selectively disconnecting certain of the image elements from at least one connection to the activation circuitry such current cannot flow from the activation circuitry to the selected image elements thereby rendering the associated image element permanently in the inactive state;
   the image elements which are not permanently in the inactive state being activated by the activation circuitry such that the image elements reflect light other than in the first direction when a voltage potential is applied to at least one of the first and second electrodes through the activation circuitry;
   whereby the combination the image elements which are disconnected and the image elements which are activated by the activation circuitry form an image which is displayed upon the application of a voltage to the activation circuitry.

18. The apparatus of claim 17 wherein the array of image elements comprises a microelectrical mechanical optical display.

19. The apparatus of claim 18 wherein when a voltage is applied to the activation circuitry of the microelectrical mechanical optical display, the light reflected from the image elements which are inactive to an observer position will contrast with the light substantially not reflected by active image elements to the observer position to thereby generate a programmed image.

20. The apparatus of claim 19 wherein the image generated is that of a subject and the substrate is an identification card for the subject.

* * * * *